Dec. 8, 1925.　　　　　　　　　　　　　　　1,564,441
G. E. PICKUP
SAFETY DEVICE FOR GAS RANGES
Filed July 5, 1924
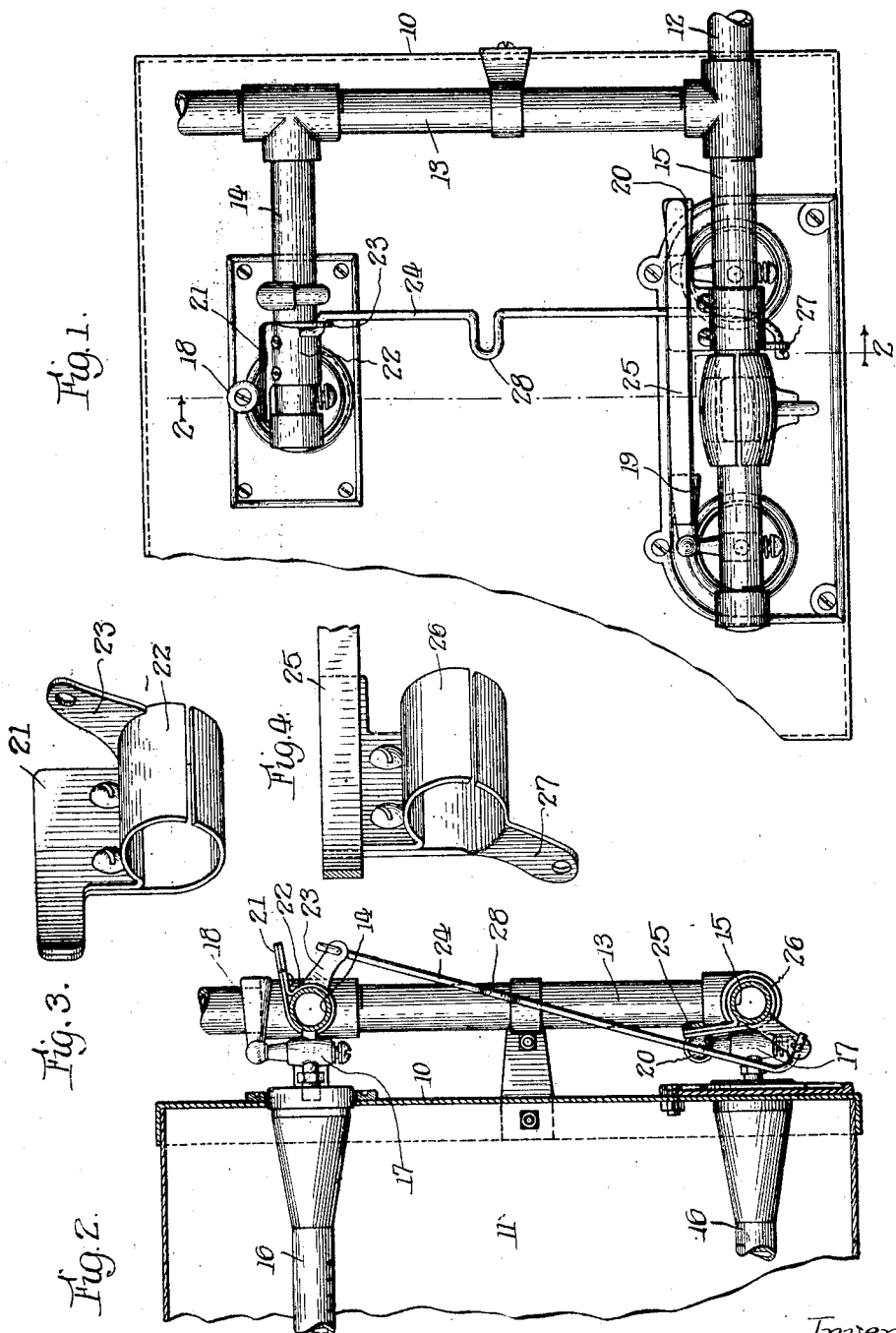
Inventor:
George E. Pickup,
By Lindell, Parker & Carlson
Attys.

Patented Dec. 8, 1925.

1,564,441

UNITED STATES PATENT OFFICE.

GEORGE E. PICKUP, OF NEWARK, OHIO, ASSIGNOR TO THE WEHRLE COMPANY, OF NEWARK, OHIO, A CORPORATION OF OHIO.

SAFETY DEVICE FOR GAS RANGES.

Application filed July 5, 1924. Serial No. 724,238.

*To all whom it may concern:*

Be it known that I, GEORGE E. PICKUP, a citizen of the United States, residing at Newark, in the county of Licking and State of Ohio, have invented a certain new and useful Safety Device for Gas Ranges, of which the following is a specification.

This invention relates generally to gas ranges of the type embodying a combination baking and broiling oven, with separate baking and broiling burners; and it relates in particular to a safety device for such an oven, which is in the nature of a valve locking device.

In gas ranges of the type referred to, the oven is equipped at the top with one or more burners for broiling purposes and at the bottom with one or more burners for baking purposes. The burner valves are usually arranged just outside the oven with the fuel pipe entering at the level of the corresponding burners. Obviously, it is essential that when the oven is used for baking the broiler burner or burners be turned off, and vice versa, when the oven is used for broiling, the baking burner or burners be inoperative; but heretofore it has been possible for one accidentally or unknowingly to have both the baking and broiling burners in operation at the same time, which under some circumstances may result in an explosion or in the generation of a dangerously excessive amount of heat.

It is the primary object of this invention to provide a safety device of such a character that if one of two or more burners is turned on it is impossible to turn on the remaining burner.

It is a general object of the invention to provide a locking device in the nature of a switching mechanism which permits any one of two valves to be opened at will and thereafter prevents the opening of the second valve while the first is still opened.

Another object of the invention is to provide a construction for the safety device which is simple and capable of being economically manufactured and furthermore to provide one of such a character that it is applicable to present types of stoves and ovens without changing their construction.

In the accompanying drawing, I have shown a device of such a character applied to a gas stove of the type hereinabove set forth but it is to be understood that other types of stoves or ovens may be equipped with any other device embodying the principles of the invention.

In Figure 1 there is represented an oven chamber having broiler burners at the top and baking burners at the bottom.

Fig. 2 is a view of the oven of Fig. 1 taken from the left hand side along the line 2—2 thereof.

Figs. 3 and 4 are detailed views of the principal parts of the safety device.

Referring particularly to the drawings, 10 designates the walls of an oven chamber 11. The oven is of the ordinary construction, and gas is supplied by a main pipe 12 through feeders 13, 14 and 15. The burners 16 are suitably arranged within the oven. Between the two feeders 14 and 15 and the burners 16, valves or gas cocks 17 are provided of the ordinary form turning on vertical axes with handles moving in horizontal planes. In the drawings, there is one valve with a handle 18 for the broiler burner, and two valves with handles 19 and 20 for the baking burners.

The safety device which I have provided is of such a character that it holds a closed valve against motion to open it, when it is itself locked by another open valve, the relation being reversible, as will appear from the detailed description hereinafter given.

As a holding means to prevent opening of the upper valve for the broiler burner by the turning of the handle 18 a swinging stop plate 21 is provided which, when vertical, is positioned in front of the handle 18 and alongside the same. In its horizontal position it underlies the handle 18 when the latter is opened, the handle then locking the plate against motion. The plate is pivotally carried by a friction collar 22 in the form of a split sheet metal sleeve mounted about the feeder pipe 14. A radial arm 23 on the collar is connected by a link 24 to similar mechanism at the baking burner valves such that each stop plate occupies reverse positions at the same time.

The valve handles 19 and 20 are similarly blocked against opening by a stop plate 25 swinging on collar 26 about the feeder pipe 15, the relation being the same as for handle 18, already described. However, it will be observed that the stop plate 25 is longer than the plate 21, assuming the form of a bar because of the provision of two valves in the present instance for the baking burners.

The simultaneous reverse relation of the two stop plates is obtained by providing an arm 27 on collar 26 in the reverse direction from arm 23 on collar 22, and by making the link 24 of such a length that one stop plate, say 21, is substantially horizontal while the other plate 25 is substantially vertical (Fig. 2). A bow 28 may be provided in the link 24 to adjust the length and to serve as a convenient handle for moving the device from one position to the other when all valves are closed.

It is clear from the relation already described that when the upper valve is opened, the handle 18 is free to turn into closed position. However, in the open position of handle 18 (Fig. 2) it is impossible to raise the stop plate 21 since the handle 18 effectively locks it in its horizontal position. In this position the plate 25 is required to be vertical and in the path of motion of handles 19 and 20 so as to prevent their being turned to open the valves to the baking burners. With all valves shut off the safety device may be manually switched to either position. Hence, the operation is the same as above described when any one of the lower two valves is opened the plate 21 then preventing opening of the upper valve 18.

I claim as my invention:

1. A gas oven having, in combination, an oven chamber, upper and lower burners, valves therefor, two feed pipes for said burners located respectively adjacent the valves, two stop plates mounted for swinging movement respectively about the axes of said pipes, and means connecting said stop plates and adapting them for simultaneous movement, the arrangement being such that when either valve is in open position the other stop plate is positioned so as to hold its valve in closed position.

2. A gas oven having, in combination, an oven chamber, upper and lower burners, valves therefor, two parallel feed pipes for said burners located respectively adjacent said valves, two friction collars, one fitting snugly about each of said pipes and each being rotatable about the axis of its pipe, a rigid stop plate on each of said collars movable into the path of operation of the adjacent burner valve, and means connecting said collars whereby one of said plates is always in position to prevent the opening of its valve when said other valve is open.

3. A gas oven having in combination, an oven chamber, upper and lower burners, valves therefor, two parallel feed pipes for said burners located respectively adjacent the valves, collars in the form of split sheet metal sleeves one mounted on each of said pipes, a rigid stop plate on each of said collars movable when the collar is rotated on its pipe into the path of operation of the adjacent valve, and means pivotally connected to each of said collars for simultaneously rotating them about the respective axes of said pipes, said stop plates being positioned so that when either of said valves is open the other plate holds its valve closed.

4. A safety device for gas ranges having a combined baking and broiling oven with upper and lower burners and separate valves therefor comprising, in combination, two stop plates mounted to turn on separate axes located respectively adjacent the separate valves, and means connecting said two stop plates, the arrangement being such that when either of the valves is in open position the stop plate of the other valve is positioned so as to hold its valve in closed position.

5. A gas oven having, in combination, an oven chamber, burners therefor, parallel gas feeding pipes for the oven, a set of valves from each pipe to supply gas to the burners in the oven, radial valve handles for said valves, said handles being parallel with the pipes in the off position and transverse thereto in the open position, collars turnable on each pipe, stop plates carried by said collars and movable by a turning of the collars into the path of operation of the valve handles in the closed position of the valve, the valve being movable into the path of motion of the stop plate in the other position of the plate, projecting arms on each of said collars, and a link connecting said arms, said arms being arranged on the collars relative to the stop plate thereon in reverse directions whereby the opening of one valve in one set prevents motion of the collars and the opening of the remaining valve.

6. A safety device for gas ranges having a combined baking and broiling oven with upper and lower burners and valves therefor, comprising, in combination, two stop plates mounted to turn on parallel axes located respectively adjacent the two valves, and means connecting said stop plates, the arrangement being such that when either of the valves is in open position the stop plate of the other valve is positioned so as to hold its valve in closed position.

In testimony whereof, I have hereunto affixed my signature.

GEORGE E. PICKUP.